(12) United States Patent
Kanemaru et al.

(10) Patent No.: US 12,536,095 B2
(45) Date of Patent: Jan. 27, 2026

(54) TEST CODE GENERATOR, TEST CODE GENERATION METHOD, AND, TEST CODE GENERATION PROGRAM

(71) Applicant: NTT, Inc., Tokyo (JP)

(72) Inventors: Sho Kanemaru, Musashino (JP); Yukitsugu Sasaki, Musashino (JP); Kensuke Takahashi, Musashino (JP); Tsuyoshi Toyoshima, Musashino (JP)

(73) Assignee: NTT, Inc., Tokyo (JP)

( * ) Notice: Subject to any disclaimer, the term of this patent is extended or adjusted under 35 U.S.C. 154(b) by 199 days.

(21) Appl. No.: 18/277,334

(22) PCT Filed: Feb. 15, 2021

(86) PCT No.: PCT/JP2021/005446
§ 371 (c)(1),
(2) Date: Aug. 15, 2023

(87) PCT Pub. No.: WO2022/172433
PCT Pub. Date: Aug. 18, 2022

(65) Prior Publication Data
US 2024/0095153 A1 Mar. 21, 2024

(51) Int. Cl.
*G06F 11/3668* (2025.01)
*G06F 9/54* (2006.01)

(52) U.S. Cl.
CPC .......... *G06F 11/3684* (2013.01); *G06F 9/541* (2013.01)

(58) Field of Classification Search
CPC .............................. G06F 11/3684; G06F 9/541
USPC .......................................................... 717/124
See application file for complete search history.

(56) References Cited

U.S. PATENT DOCUMENTS

| | | | |
|---|---|---|---|
| 7,337,431 B1 * | 2/2008 | Barnes ................ | G06F 11/3698 717/124 |
| 8,935,371 B2 * | 1/2015 | Gebhart ................ | G06F 9/485 717/121 |
| 9,177,452 B1 * | 11/2015 | Mosterman .............. | G08B 6/00 |
| 2003/0046658 A1 * | 3/2003 | Raghavan ................ | G06F 8/44 717/106 |
| 2019/0188116 A1 * | 6/2019 | Roth .................. | G06F 11/3608 |
| 2022/0138091 A1 | 5/2022 | Kanemaru et al. | |

FOREIGN PATENT DOCUMENTS

WO  WO 2020175161  9/2020

* cited by examiner

*Primary Examiner* — Bradford F Wheaton
(74) *Attorney, Agent, or Firm* — Fish & Richardson P.C.

(57) ABSTRACT

A test code generation device includes an action generation unit that acquires at least one of pieces of API-related data of an API specification, an API execution order file, a parameter setting file, a script setting file, a test type, and a parameter list and generates action code data corresponding to an action of a state transition pattern of an API adapter, and the test code generation unit that generates a test code of the API adapter based on the action code data generated by the action generation unit and the state transition pattern of the API adapter.

6 Claims, 27 Drawing Sheets

Fig. 5

```
swagger: "2.0"
info:
  title: Swagger Petstore
  version: 1.0.2
schemes:                                              ~d1
  - http
paths:
  "/pet/{petId}":
    get:
      summary: Find a pet by ID
      description: Returns a single pet
      operationId: getPetById
      produces:
        - application/json; charset=utf-8
      parameters:
        - name: petId
          in: path
          required: true
          type: integer
          format: int64
          x-example: 99999
      responses:
        "200":
          description: successful operation    }x1
          schema:
            "$ref": "#/definitions/Pet"
        "400":                                  }x2
          description: error operation
          schema:
            "$ref": "#/definitions/Pet"
```

```
                                    d11
                                    /
┌─────────────────────────────────────────────────────────────┐
│ ┌──────────┬──┬──────────────────────────────────────────┐  │
│ │ POST   ▾ │  │ /orderManagement/v1/productOrder         │  │
│ └──────────┴──┴──────────────────────────────────────────┘  │
│                                                              │
│ Params   Authorization   Headers (13)   Body●  Pre-request Script ●  Tests●   Settings │
│                                                              │
│ ○none   ○form-data   ○x-www-form-urlencoded   ⦿raw   ○binary   ○GraphQL   JSON ▾ │
│                                                              │
│ ┌──┬──────────────────────────────────────────────────────┐ │
│ │ 1│ {                                                    │ │
│ │ 2│   "description": "modify productOrder request",      │ │
│ │ 3│   "orderDate": "",                                   │ │
│ │ 4│   "orderItem": [                                     │ │
│ │ 5│     {                                                │ │
│ │ 6│       "id": "",                                      │ │
│ │ 7│       "action": "modify",                            │ │
│ │ 8│       "billingAccount": [                            │ │
│ │ 9│         {                                            │ │
│ │10│           "id": "",                            ⎤     │ │
│ │11│           "href": "",                          ⎬x3   │ │
│ │12│           "name": ""                           ⎦     │ │
│ │13│         }                                            │ │
│ │14│       ],                                             │ │
│ │15│       "productOffering": {                           │ │
│ │16│         "id": "",                                    │ │
│ │17│         "href": "",                                  │ │
│ │18│         "name": ""                                   │ │
│ │19│       },                                             │ │
│ │20│       "product": {                                   │ │
│ │21│         "characteristic": [                          │ │
│ │22│           {                                          │ │
│ │23│             "name": "vgw.id",                        │ │
│ │24│             "value": ""                              │ │
│ │25│           },                                         │ │
│ │26│           {                                          │ │
│ │27│             "name": "edge.connect.id",               │ │
│ │28│             "value": ""                              │ │
│ │29│           },                                         │ │
│ │30│           {                                          │ │
│ │31│             "name": "edge.connect.enabled",          │ │
│ │32│             "value": ""                              │ │
│ │33│           },                                         │ │
│ └──┴──────────────────────────────────────────────────────┘ │
└─────────────────────────────────────────────────────────────┘

```
{
"filename" : "sim_collection.json"
"path" :"/sim"                        }x7
"method" : POST"
},
{
"filename" : "group_collection.json"
"path" :"/simgroup"
"method" : POST"
},
{
"filename" : "group_collection.json"
"path" :"/group"
"method" : PUT"
},
{
"filename" : "group_collection.json"
"path" :"/group"
"method" : GET"
}
``` d2

Fig. 8

```
"values":[ {    ⟋x4
    "group_post_request.url.variable.[0].value":"{{url}}",
    "group_post_request.variable.[1].value":"{{sample}}",
    "group_post_request.body.raw.id":"{{env-3-1-1-company-id}}"
} ]
``` d3, x5, x6

```
Params  Authorization  Headers (13)  Body ●  Pre-request Script ●  Tests ●  Settings
○none  ○form-data  ○x-www-form-urlencoded  ●raw  ○binary  ○GraphQL  JSON ▾
1 2 3 4 5 6 7 8 9 10 11 12 13 14 15 16 17 18 19 20 21 22 23 24 25 26 27 28 29 30 31 32 33
"description":"add productOrder request",
"orderDate":["g1-3-1-1-orderDate"],
"orderItem": [
    "id":["env_3-1-1-company_id"],
    "action":"add",
    "billingAccount": [
        "id":["env_3-1-1-company_id"],
        "href":"http://apio.ntt.co.jp/billingManagement/v1/billingAccount/env_3-1-1-company_id",
        "name":"env_3-1-1-company_name"
    ],
    "productOffering": [
        "id":["env_3-1-1-company_id"],
        "href":"http://apio.ntt.co.jp/catalogManagement/v1/productOffering/env_3-1-1-company_id",
        "name":["env_3-1-1-company_name"]
    ],
    "product": {
        "characteristic": [
            "name":"vgw.edge.area",
            "value":["env_3-1-1-vgw.edge.area"],
            "name":"edge.connect.id",
            "value":["env_3-1-1-edge.connect.id"],
            "name":"vgw.edge.redundancy.enabled",
            "value":["env_3-1-1-edge_sgi_redundancy.enable"]
        ]
    }
}
``` d13

```
"listen": "test",
"script": {
    "id": "8788396c-b3ff-44c5-a316-58b1a8b8e02f",
    "exec": [
        "if (responseCode.code === 201) {",      ⎫
        "   pm.test(¥"response code is 204 ¥", true);",  ⎬
        "}"                                              ⎪
        "pm.test(¥"response code is 201¥", function () {",  ⎬ x31
        "   (pm.response.to.have.status(201) ",          ⎪
        "});",                                            ⎪
        "*/",                                             ⎭
    ],
    "type": "text/javascript"
}
```

▲ sim

POST ▼ | /sim

Params    Authorization    Headers (13)    Body ●    Pre-request Script ●    Tests ●    Settings d14

```
1  if (responseCode.code === 204) {}
2      pm.test("response code is 204 ", true);
3  else if (responseCode.code === 404) {
4      pm.test("response code is 404 ", true);
5  } else {
6      pm.test("response code is 204 or 404", false);
7  }
8
9  pm.test("response code is 204 or 404", function () {
10     (pm.response.to.have.status(204) || pm.response.to.have.status(404));
11 });
12
13
```

|  | INITIAL STATE | PRE-START | IN-SERVICE | STOPPED |
|---|---|---|---|---|
| INITIAL STATE |  | start |  |  |
| PRE-START | reset |  | start |  |
| IN-SERVICE |  | reset |  | pause |
| STOPPED |  | reset | start |  |

Fig. 18A

STATE TRANSITION TABLE OF 0-SWITCH COVERAGE  Q1

|  | INITIAL STATE | PRE-START | IN-SERVICE | STOPPED |
|---|---|---|---|---|
| INITIAL STATE |  | start |  |  |
| PRE-START | reset |  | start |  |
| IN-SERVICE |  | reset |  | pause |
| STOPPED |  | reset | start |  |

Fig. 18B

STATE TRANSITION TABLE OF 0-SWITCH COVERAGE Q2

|  | INITIAL STATE | PRE-START | IN-SERVICE | STOPPED |
|---|---|---|---|---|
| INITIAL STATE |  | start |  |  |
| PRE-START | reset |  | start |  |
| IN-SERVICE |  | reset |  | pause |
| STOPPED |  | reset | start |  |

Fig. 18C

STATE TRANSITION TABLE OF 1-SWITCH COVERAGE Q3
(TWO TIMES OF STATE TRANSITION)

|  | INITIAL STATE | PRE-START | IN-SERVICE | STOPPED |
|---|---|---|---|---|
| INITIAL STATE | start + reset |  | start + start |  |
| PRE-START |  | start + reset | start | start + pause |
| IN-SERVICE | reset + reset |  | reset + start<br>pause + start |  |
| STOPPED | reset + reset | reset + start | reset + start | start + pause |

Fig. 19A

STATE TRANSITION TABLE OF 1-SWITCH COVERAGE Q11

|  | INITIAL STATE | PRE-START | IN-SERVICE | STOPPED |
|---|---|---|---|---|
| INITIAL STATE | start+reset |  | start+start |  |
| PRE-START |  | start+reset |  | start+pause |
| IN-SERVICE | reset+reset |  | reset+start<br>pause+start |  |
| STOPPED | reset+reset | reset+start | reset+start | start+pause |

Fig. 19B

STATE TRANSITION TABLE OF 0-SWITCH COVERAGE $Q12$

|  | INITIAL STATE | PRE-START | IN-SERVICE | STOPPED |
|---|---|---|---|---|
| INITIAL STATE |  | start |  |  |
| PRE-START | reset |  | start |  |
| IN-SERVICE |  | reset |  | pause |
| STOPPED |  | reset | start |  |

Fig. 19C

STATE TRANSITION TABLE OF 2-SWITCH COVERAGE Q13
(THREE TIMES OF STATE TRANSITION)

|  | INITIAL STATE | PRE-START | IN-SERVICE | STOPPED |
|---|---|---|---|---|
| INITIAL STATE |  | start + reset + start, start + start + reset |  | start + start + pause |
| PRE-START |  |  |  |  |
| IN-SERVICE |  |  |  |  |
| STOPPED |  |  |  |  |

// TEST CODE GENERATOR, TEST CODE GENERATION METHOD, AND, TEST CODE GENERATION PROGRAM

CROSS-REFERENCE TO RELATED APPLICATIONS

This application is a National Stage application under 35 U.S.C. § 371 of International Application No. PCT/JP2021/005446, having an International Filing Date of Feb. 15, 2021, the disclosure of which is considered part of the disclosure of this application, and is incorporated by reference in its entirety into this application.

TECHNICAL FIELD

The present invention relates to a test code generation device, a test code generation method, and a test code generation program.

BACKGROUND ART

With the spread of Business To Business To X (B2B2X), new services have been constructed and operated by combining a plurality of services. Since new services appear and the specifications of existing services are frequently changed, service providers are required to respond to these changes quickly and at low cost.

In order to deal with this, a technique has been developed for automatically generating an API adapter that absorbs and collaborates the differences in specifications of application programming interfaces (APIs) for respective services published by each provider.

In a development test executed when developing such an API adapter, it is necessary to generate a test code in consideration of a state transition pattern of the API adapter. Since much labor is required for generating test codes, automation is desired.

For example, PTL 1 discloses a method of automatically generating a template of a test code on the basis of an API specification.

CITATION LIST

Patent Literature

[PTL 1] WO 2020/175161

SUMMARY OF INVENTION

Technical Problem

However, PTL 1 does not mention generation of a test code in consideration of the transition state pattern. For this reason, there is a problem that a developer needs to generate a test code in consideration of the transition state pattern, which requires much labor.

The present invention has been made in view of the above-mentioned circumstances, and an object of the present invention is to provide an automatic test code generation device, an automatic test code generation method, and an automatic test code generation program capable of automatically generating a test code of an API adapter in consideration of a transition state.

Solution to Problem

According to one aspect of the present invention, there is provided a test code generation device including an action generation unit that acquires API-related data and generates action code data corresponding to an action of a state transition pattern of an API adapter, and a test code generation unit that generates a test code of the API adapter based on the action code data generated by the action generation unit and the state transition pattern of the API adapter.

According to one aspect of the present invention, there is provided a test code generation method including a step of acquiring API-related data and generating action code data corresponding to an action of a state transition pattern of an API adapter, and a step of generating a test code of the API adapter based on the action code data and the state transition pattern of the API adapter.

According to one aspect of the present invention, there is provided a test code generation program for causing a computer to function as the test code generation device.

Advantageous Effects of Invention

According to the present invention, it is possible to automatically generate a test code of an API adapter in consideration of a transition state.

BRIEF DESCRIPTION OF DRAWINGS

FIG. 5 is an explanatory diagram illustrating an example of an API specification.

FIG. 6 is an explanatory diagram illustrating an example of template code data.

FIG. 7 is an explanatory diagram illustrating an example of an API execution order file.

FIG. 8 is an explanatory diagram illustrating an example of a parameter setting file.

FIG. 9 is an explanatory diagram illustrating an example of parameter reflection code data.

FIG. 11 is an explanatory diagram illustrating an example of a "postman collection" file in which a result checking script is embedded.

FIG. 12B is an explanatory diagram illustrating an example of script reflection code data.

FIG. 16 is an explanatory diagram illustrating a state transition pattern and actions of an API adapter.

FIG. 18A is a first explanatory diagram illustrating a state transition table of 0-switch coverage.

FIG. 18B is a second explanatory diagram illustrating a state transition table of 0-switch coverage.

FIG. 18C is an explanatory diagram illustrating a state transition table of 1-switch coverage generated by multiplying the state transition tables of 0-switch coverage illustrated in FIGS. 18A and 18B.

FIG. 19A is an explanatory diagram illustrating a state transition table of 1-switch coverage.

FIG. 19B is an explanatory diagram illustrating a state transition table of 0-switch coverage.

FIG. 19C is an explanatory diagram illustrating a state transition table of 2-switch coverage generated by multiplying the state transition table of 1-switch coverage and the state transition table of 0-switch coverage illustrated in FIGS. 19A and 19B.

DESCRIPTION OF EMBODIMENTS

Figure 1:
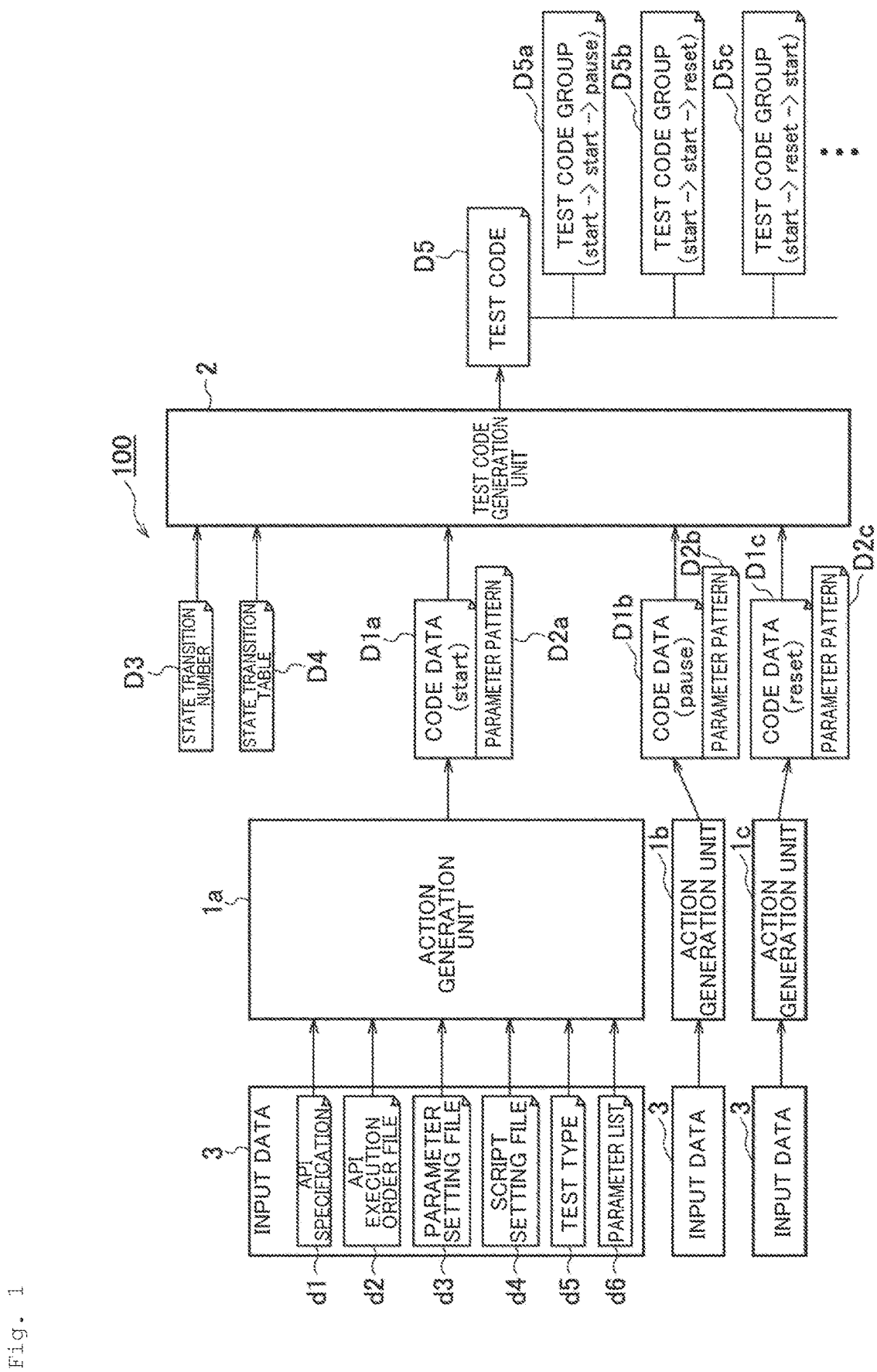
FIG. 1 is a block diagram illustrating a configuration of a test code generation device according to an embodiment.

An embodiment of the present invention will be described below with reference to the accompanying drawings. FIG. 1 is a block diagram illustrating the configuration of a test code generation device according to the present embodiment. As illustrated in FIG. 1, a test code generation device 100 according to the present embodiment includes a plurality of (three in the drawing) action generation units 1 (1a, 1b, and 1c) and a test code generation unit 2.

The test code generation device 100 automatically generates a test code for testing the operation of an API adapter when developing the API adapter. The API adapter shown in the present embodiment is a server that provides a representational state transfer (REST) API.

The action generation units 1 (1a, 1b, and 1c) are provided for actions "start," "pause," and "reset" indicating the state transition pattern of the API adapter, respectively, and generate a test code for each action. Although the above three types of actions will be described in the present embodiment, actions other than these may be set.

Figure 2:
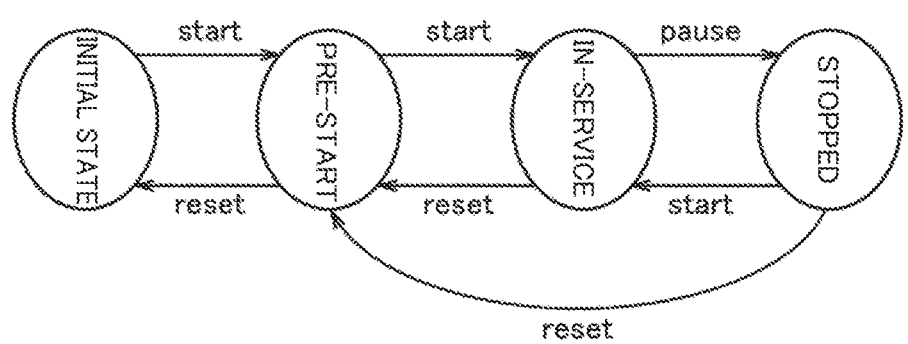
FIG. 2 is an explanatory diagram illustrating a state transition pattern of an API adapter.

FIG. 2 is an explanatory diagram illustrating the state transition of the API adapter. As illustrated in FIG. 2, an action of transitioning from an initial state to a pre-start state, an action of transitioning from the pre-start state to an in-service state, and an action of transitioning from a stopped state to the in-service state include "start" indicating a start.

An action of transitioning from the in-service state to the stopped state includes "pause" indicating a pause. An action of transitioning from the stopped state to the pre-start state, an action of transitioning from the in-service state to the pre-start state, and an action of transitioning from the pre-start state to the initial state include "reset" indicating an end.

The action generation unit 1a illustrated in FIG. 1 generates data of a test code for "start." The action generation unit 1b generates data of a test code for "pause." The action generation unit 1c generates data of a test code for "reset." In the following, when the action generation units 1a to 1c are specified and indicated, they are indicated with a suffix such as an "action generation unit 1a," for example, and when the action generation units 1a to 1c are not specified or are collectively indicated, they are indicated without a suffix such as an "action generation unit 1."

Various types of API-related data included in input data 3 are input to each action generation unit 1. The API-related data includes an API specification d1, an API execution order file d2, a parameter setting file d3, a script setting file d4, a test type d5, and a parameter list d6. Further, the API-related data may include at least one of the API specification d1, the API execution order file d2, the parameter setting file d3, the script setting file d4, the test type d5, and the parameter list d6.

The API specification d1 is a file that defines the specification of "REST API." The API specification d1 includes input parameter information and response information at the time of success/failure. Details of the API specification d1 will be described later with reference to FIG. 5.

The API execution order file d2 is a file that defines an API execution order for implementing an action. Details of the API execution order file d2 will be described later with reference to FIG. 7.

The parameter setting file D3 is a file that defines variable information to be embedded in a template of a test code. Details of the parameter setting file D3 will be described later with reference to FIG. 8.

The script setting file d4 is a file that defines a script for checking whether or not a test execution result is an expected result and defines a correspondence relation with each API request. Details of the script setting file d4 will be described later with reference to FIG. 10.

The test type d5 includes a numerical value indicating a test type such as a test of a normal system and a test of a quasi-normal system. Details of the test type d5 will be described later with reference to FIG. 13.

The parameter list d6 is a file including parameters used for executing the API of each action. Details of the parameter list d6 will be described later with reference to FIG. 15.

Figure 3:
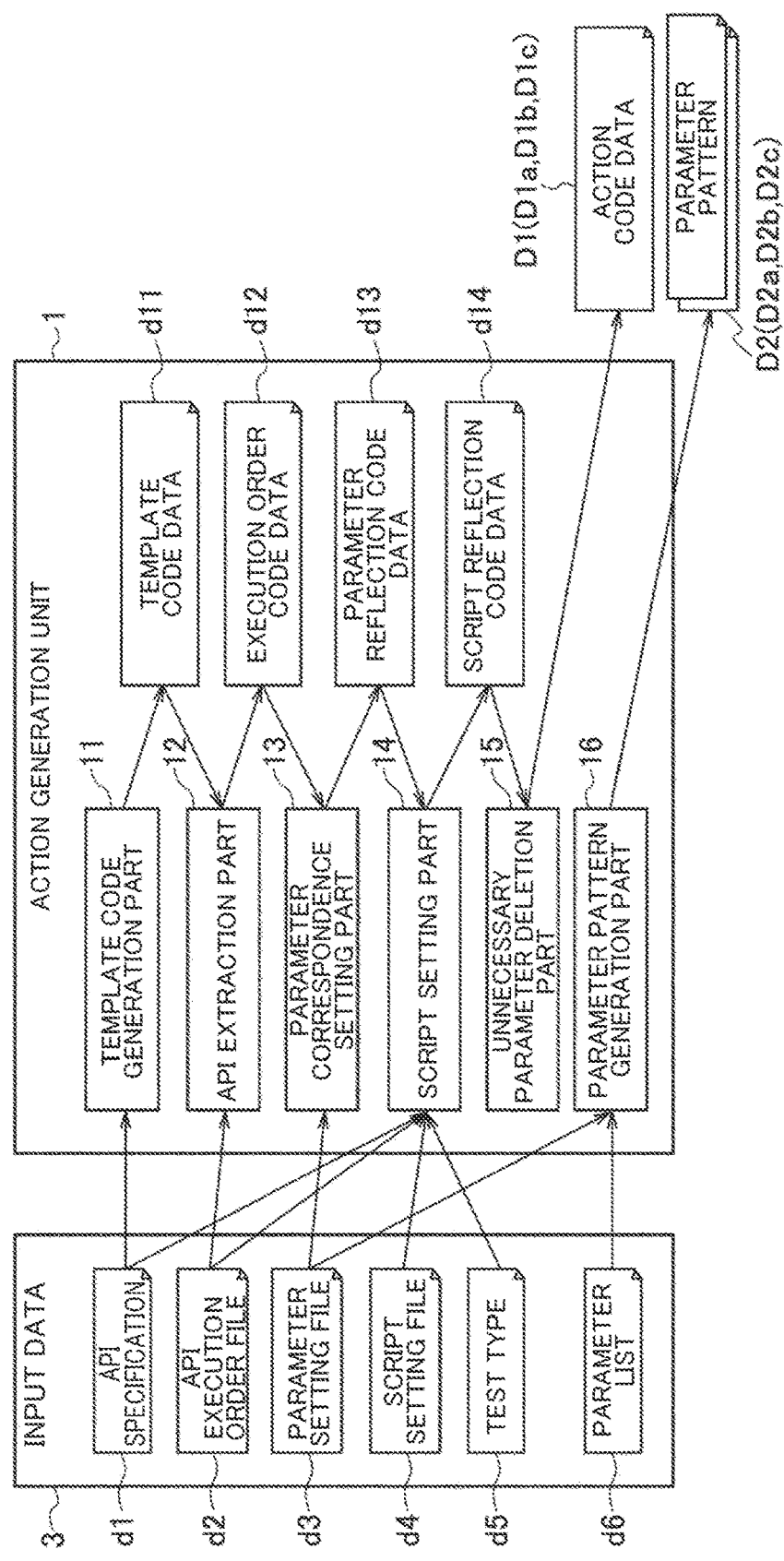
FIG. 3 is a block diagram illustrating a detailed configuration of an action generation unit.
Figure 4:
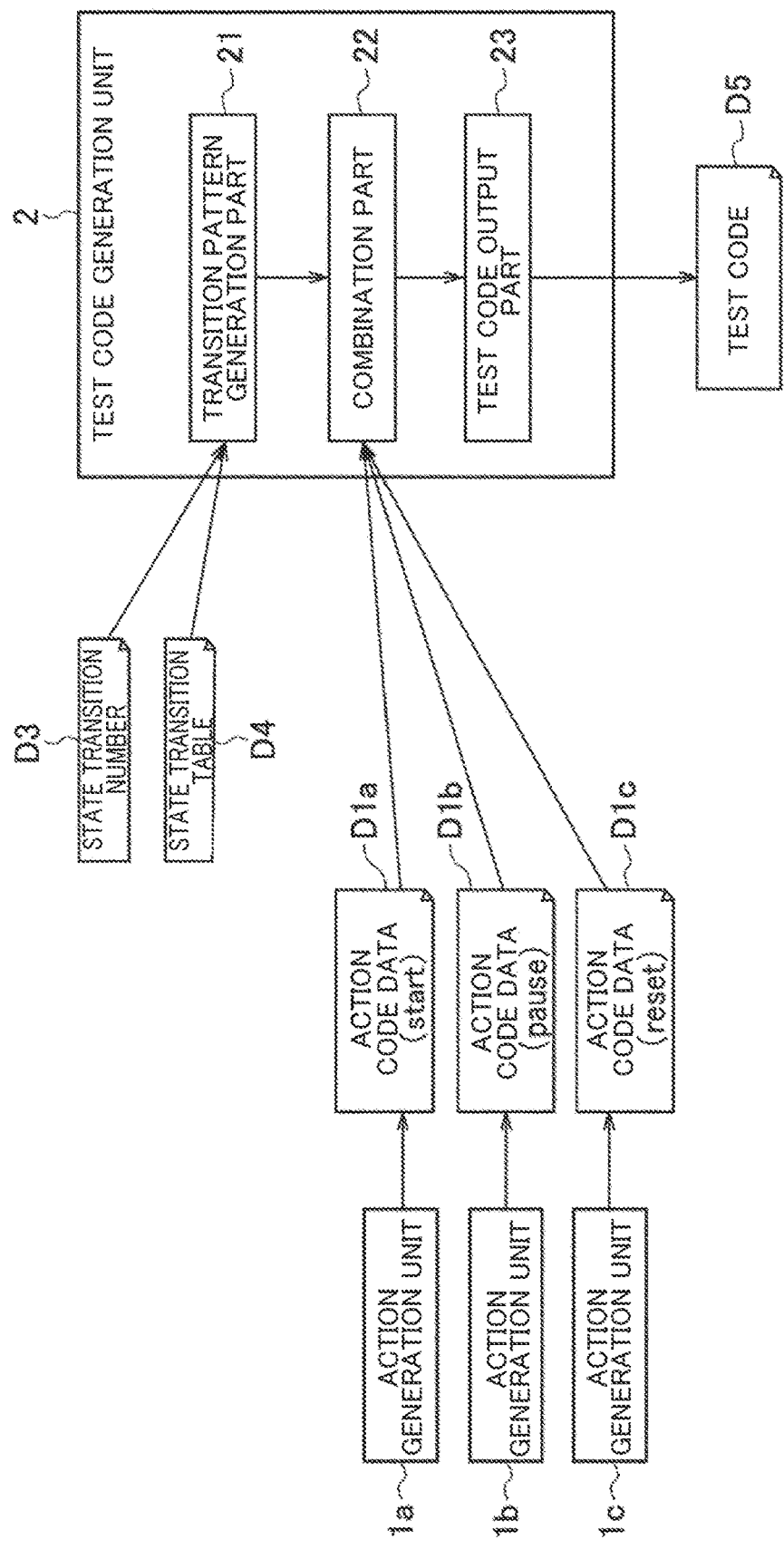
FIG. 4 is a block diagram illustrating a detailed configuration of a test code generation unit.

FIG. 3 is a block diagram illustrating the detailed configuration of the action generation unit 1, and FIG. 4 is a block diagram illustrating the detailed configuration of the test code generation unit 2. As illustrated in FIG. 3, the action generation unit 1 includes a template code generation part 11, an API extraction part 12, a parameter correspondence setting part 13, a script setting part 14, an unnecessary parameter deletion part 15, and a parameter pattern generation part 16.

The template code generation part 11 acquires data of the API specification d1. The template code generation part 11 also generates data of a test code serving as a template (hereinafter referred to as "template code data d11") on the basis of the acquired API specification d1. An example of an API specification include an open API specification.

The template code generation part 11 generates template code data d11 by the same number as the API specification d1. The template code generation part 11 generates template code data d11 by using, for example, "postman" which is a well-known test tool.

FIG. 5 is an explanatory diagram illustrating a specific example of the API specification d1. As the API specification d1, for example, a "REST API" description format independent of a programming language can be used. In the API specification d1, the response is "200" at the time of success as indicated by a symbol x1 in FIG. 5, and the response is "400" at the time of failure as indicated by a symbol x2.

FIG. 6 is an explanatory diagram illustrating an example of "postman collection" output as the template code data d11. The "postman collection" is a collection of requests managed by "postman" in units of service or the like. The file illustrated in FIG. 6 is a "json" file. Since the file illustrated in FIG. 6 is a template, the description column of the parameter indicated by a symbol x3 is blank.

Referring back to FIG. 3, the API extraction part 12 acquires the API execution order file d2 and the template code data d11. The API extraction part 12 also generates data of a test code reflecting the execution order (hereinafter referred to as "execution order code data d12") on the basis of the API execution order file d2 and the template code data d11.

FIG. 7 is an explanatory diagram illustrating a specific example of the API execution order file d2. As illustrated in FIG. 7, the API execution order file d2 includes a file name of the template code data d11 and identifiers of the APIs used in the test, "method" and "path," as indicated by a symbol x7.

The parameter correspondence setting part 13 acquires the parameter setting file d3 and the execution order code data d12. The parameter correspondence setting part 13 also generates data of a test code reflecting the parameter correspondence (hereinafter referred to as "parameter reflection code data d13") on the basis of the parameter setting file d3 and the execution order code data d12. FIG. 8 is an explanatory diagram illustrating an example of the parameter setting file d3.

As illustrated in FIG. 8, the parameter setting file d3 includes an API request name (symbol x4) of the execution order code data d12, a body parameter name (symbol x5), a parameter name (symbol x6), a file name, and identifiers (method and path) of the APIs used in the test.

FIG. 9 is an explanatory diagram illustrating a specific example of the parameter reflection code data d13. As illustrated in FIG. 9, in the parameter reflection code data d13, various parameters are described in blanks included in the template code data d11 illustrated in FIG. 6.

The script setting part 14 acquires the API specification d1, the API execution order file d2, the script setting file d4, the test type d5, the parameter reflection code data d13. The script setting part 14 generates data of a test code reflecting a script for result checking (hereinafter referred to as "script reflection code data d14") on the basis of the API specification d1, the API execution order file d2, the script setting file d4, the test type d5, the parameter reflection code data d13. As described above, the test type d5 includes a numerical value for identifying a normal system/quasi-normal system.

Figure 10:
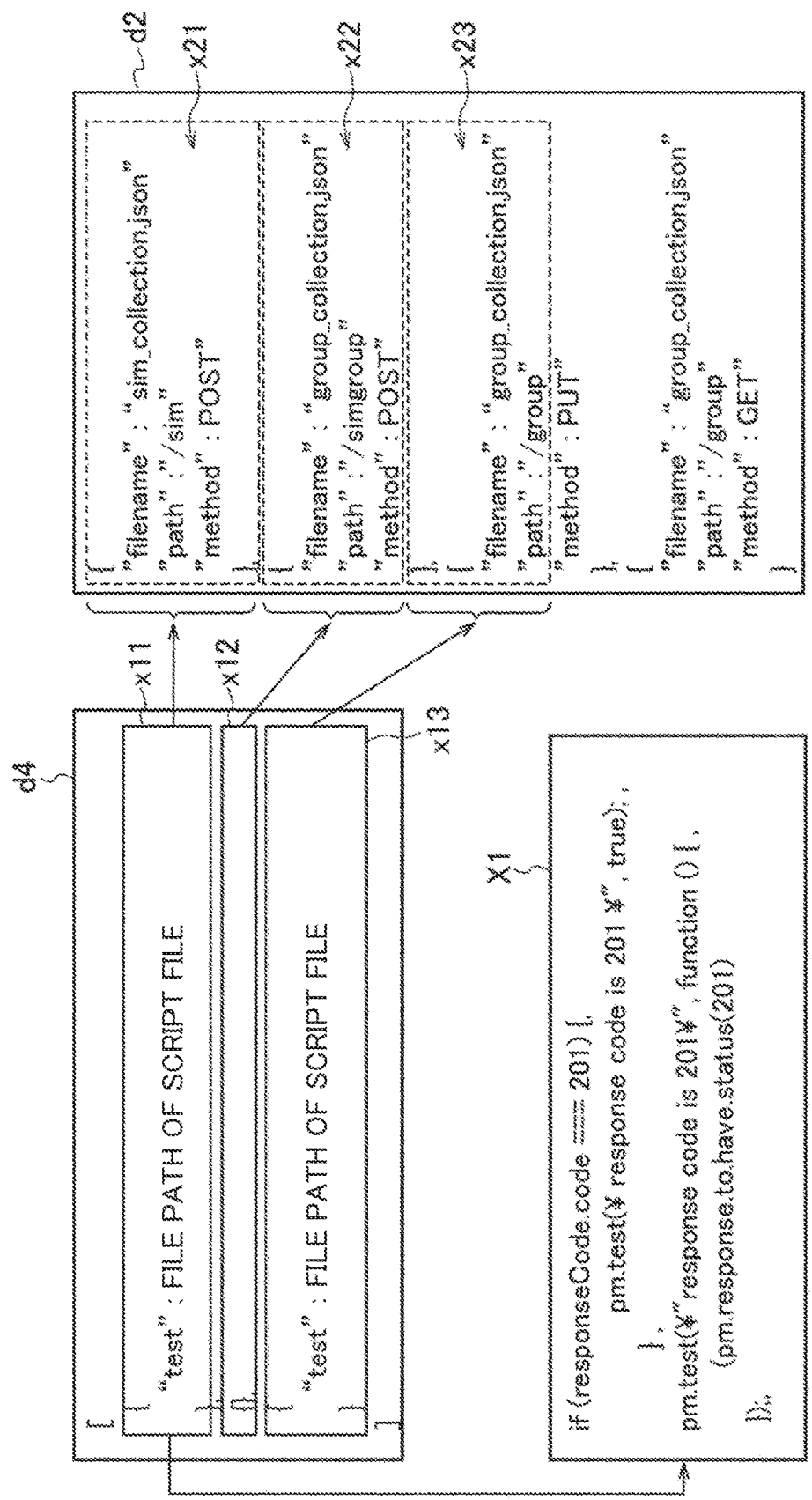
FIG. 10 is an explanatory diagram illustrating an example of a script setting file for result checking.

FIG. 10 is an explanatory diagram illustrating a specific example of the script setting file d4. The script setting file d4 includes a file path of a result checking script. The script setting file d4 has a 1:1 correspondence with the API execution order file d2.

That is, file paths indicated by symbols x11, x12, and x13 of the script setting file d4 for result checking illustrated in FIG. 10 are correlated with symbols x21, x22, and x23 of the API execution order file d2, respectively. Also, the file of the result checking script is set, for example, as indicated by a symbol X1.

When the file path of the result checking script is blank in the script setting file d4, a script for response code checking is embedded. FIG. 11 is an explanatory diagram illustrating an example of a "postman collection" file in which a result checking script is embedded. As indicated by a symbol x31 in FIG. 11, in the "postman collection," a result checking script can be set by embedding "javascript" under "exec" under "script."

Figure 12A:
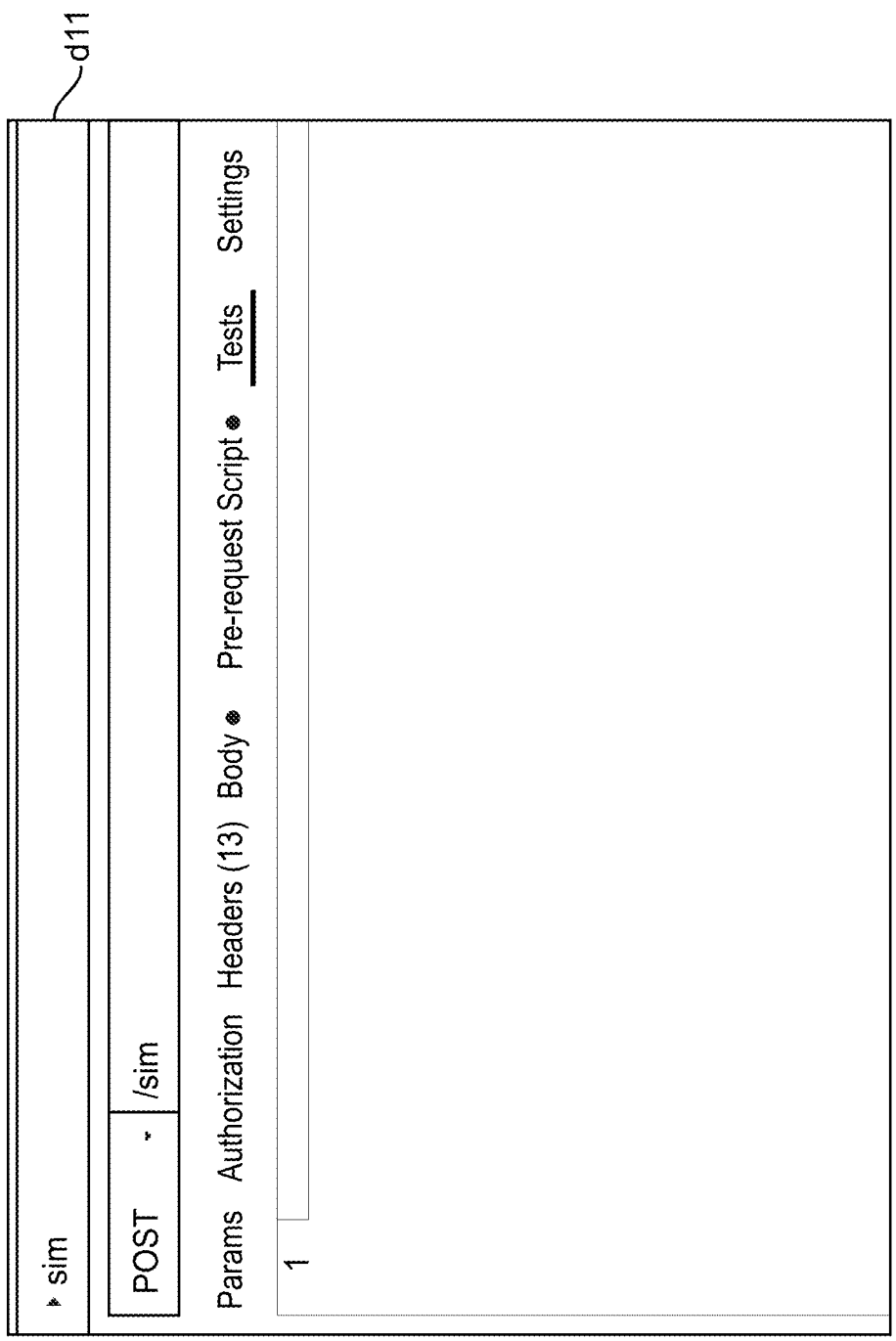
FIG. 12A is an explanatory diagram illustrating an example of template code data.

FIG. 12A is an explanatory diagram illustrating a specific example of the template code data d11, and FIG. 12B is an explanatory diagram illustrating a specific example of the script reflection code data d14. As illustrated in FIG. 12B, "javascript" is embedded in the "Test" tab of "postman collection" by the script setting part 14.

Figure 13:
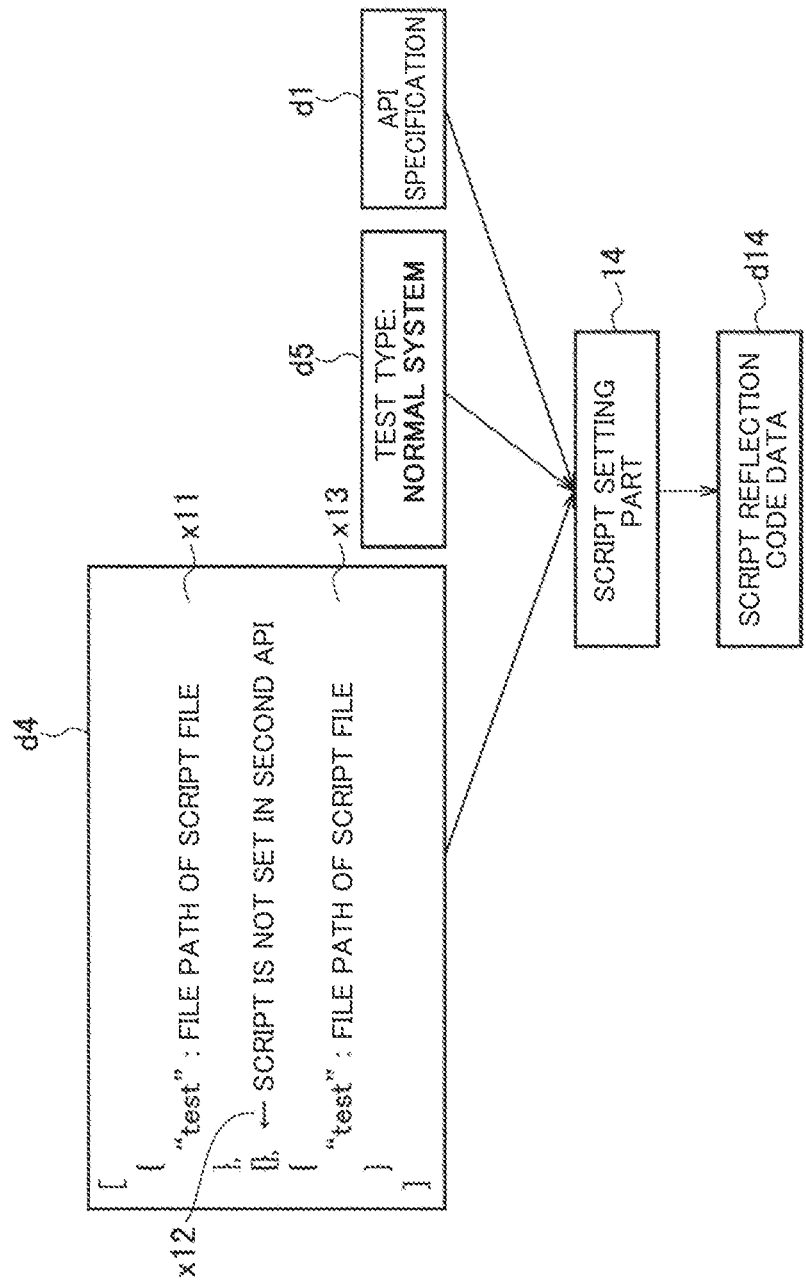
FIG. 13 is an explanatory diagram illustrating a script setting file, a test type, and an API specification input to a script setting part.

The script setting part 14 also embeds a response code checking script corresponding to the API specification d1 and the test type d5 when the file path of the result script is blank. FIG. 13 is an explanatory diagram illustrating a specific example of generating the script reflection code data d14 on the basis of the script setting file d4, the API specification d1, and the test type d5. In the example illustrated in FIG. 13, "javascript" for checking that the response code is 200 is embedded in "postman collection" in the parameter reflection code data d13.

Figure 14:
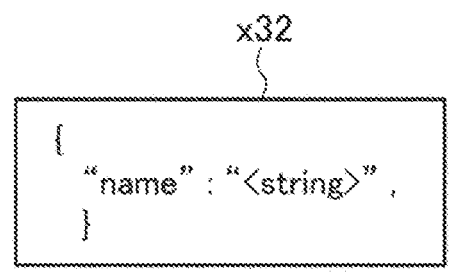
FIG. 14 is an explanatory diagram illustrating an example of a parameter for which "value" is not set.

The unnecessary parameter deletion part 15 reads the script reflection code data d14 set by the script setting part 14 and deletes unnecessary parameters. For example, as indicated by a symbol x32 in FIG. 14, parameters for which "value" is not set are deleted from the script reflection code data d14. Code data after deleting the unnecessary parameters are output as action code data D1. Since numerical values are not included in the unessential parameters, the unnecessary parameter deletion part 15 deletes unnecessary parameters.

Figure 15:
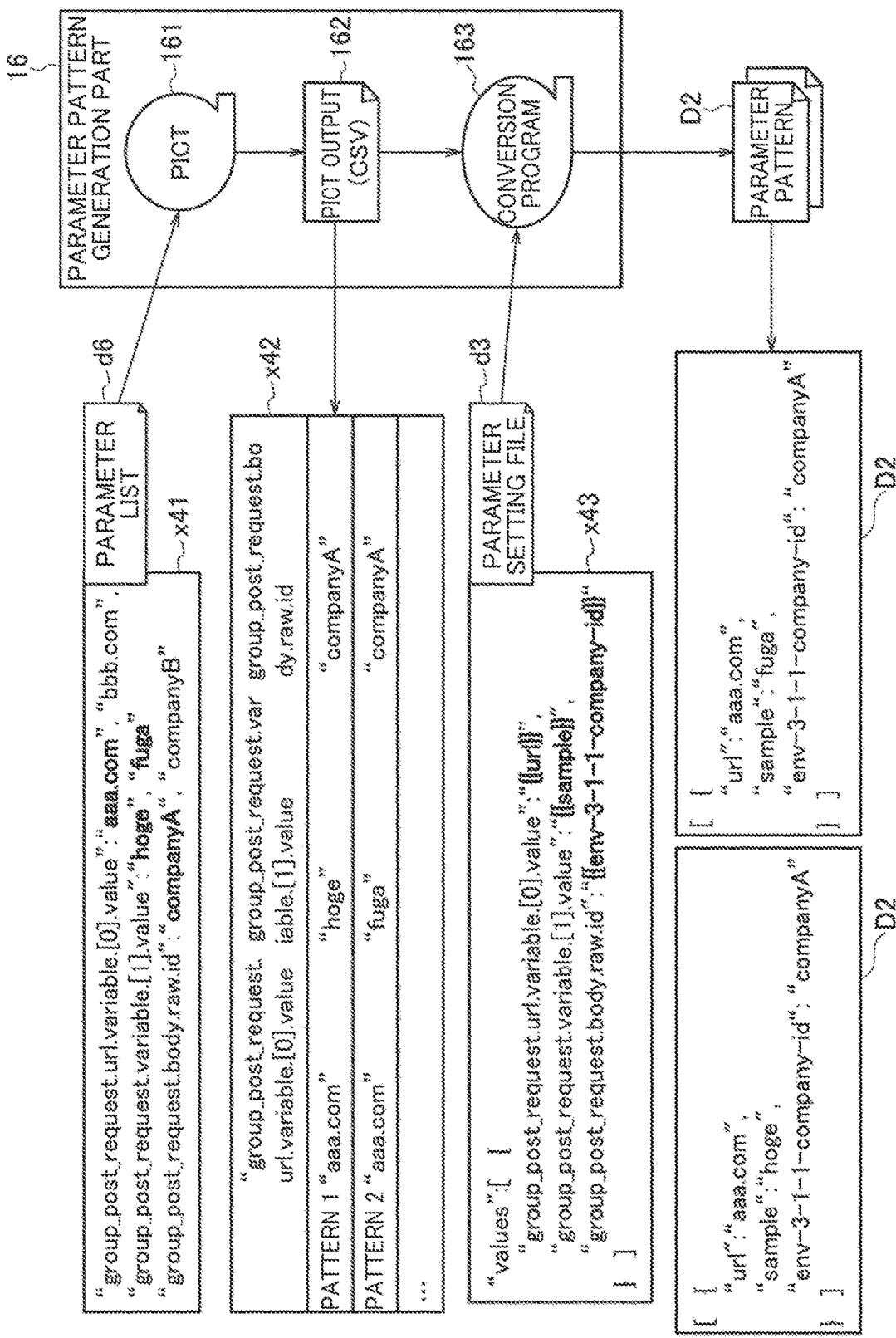
FIG. 15 is an explanatory diagram illustrating processing by a parameter pattern generation part.

The parameter pattern generation part 16 acquires the parameter list d6 and the parameter setting file d3. The parameter pattern generation part 16 also generates parameter patterns D2 (D2a, D2b, and D2c) by using the parameter list d6 and the parameter setting file d3. As illustrated in FIG. 15, the parameter pattern generation part 16 includes a PICT program 161 and a conversion program 163.

An existing technique, the "pairwise" method, can be employed to generate the parameter pattern. The parameter list d6 has, for example, data indicated by a symbol x41 in FIG. 15.

The PICT program 161 can be used to generate the parameter pattern using the "pairwise" method. A PICT output 162 is obtained by using the PICT program 161. The files of the parameter patterns are generated by the number of patterns.

The parameter patterns are represented in a format readable by the '−d' option of "newman."

As the PICT output 162, for example, data indicated by a symbol x42 is obtained.

The conversion program 163 generates the parameter pattern D2 on the basis of the PICT output 162 and the parameter setting file d3 indicated by a symbol x43.

In the present embodiment, in each of the action generation units 1a, 1b, and 1c illustrated in FIG. 1, processing by the template code generation part 11, the API extraction part 12, the parameter correspondence setting part 13, the script setting part 14, the unnecessary parameter deletion part 15, and the parameter pattern generation part 16 described above is executed.

The test code generation unit 2 illustrated in FIG. 4 includes a transition pattern generation part 21, a combination part 22, and a test code output part 23.

The transition pattern generation part 21 acquires a state transition number D3 and a state transition table D4 of an API adapter to be tested. The transition pattern generation part 21 also generates a state transition pattern on the basis of the state transition number D3 and the state transition table D4. As illustrated in FIG. 2, the API adapter to be tested undergoes state transitions among the "initial state," the "pre-start state," the "in-service state," and the "stopped state." There are three types of actions of the state transition pattern, namely "start," "pause," and "reset." Specifically, there are actions of the state transition pattern illustrated in FIG. 16. Also, the state transition number D3 is "3."

Figure 17:
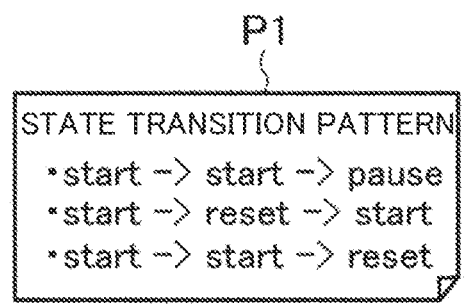
FIG. 17 is an explanatory diagram illustrating a state transition pattern generated by a transition pattern generation part.

The transition pattern generation part 21 also generates state transition patterns covering the state transition number. FIG. 17 is an explanatory diagram illustrating a combination of state transition patterns generated by the transition pattern generation part 21. As indicated by a symbol P1 in FIG. 17, when the state transitions from the "initial state" to the "stopped state," for example, a state transition pattern consisting of actions "'start'→'start'→'pause'" is generated.

N-switch coverage can be used in generating state transition patterns. 2-switch coverage is executed in order to cover patterns of three times of state transition with N-switch coverage.

First, by multiplying the state transition patterns of 0-switch coverage with each other, the state transition pattern of 1-switch coverage can be generated. Specifically, by multiplying a state transition pattern Q1 of 0-switch coverage illustrated in FIG. 18A and a state transition pattern Q2 of 0-switch coverage illustrated in FIG. 18B, a state transition pattern Q3 of 1-switch coverage (two times of state transition) illustrated in FIG. 18C can be generated.

First, by multiplying the state transition patterns of 1-switch coverage and the state transition patterns of 0-switch coverage, the state transition pattern of 2-switch coverage can be generated. Specifically, by multiplying a state transition pattern Q11 of 1-switch coverage illustrated in FIG. 19A and a state transition pattern Q12 of 0-switch coverage illustrated in FIG. 19B, a state transition pattern Q13 of 2-switch coverage (three times of state transition) illustrated in FIG. 19C can be generated.

Figure 20:
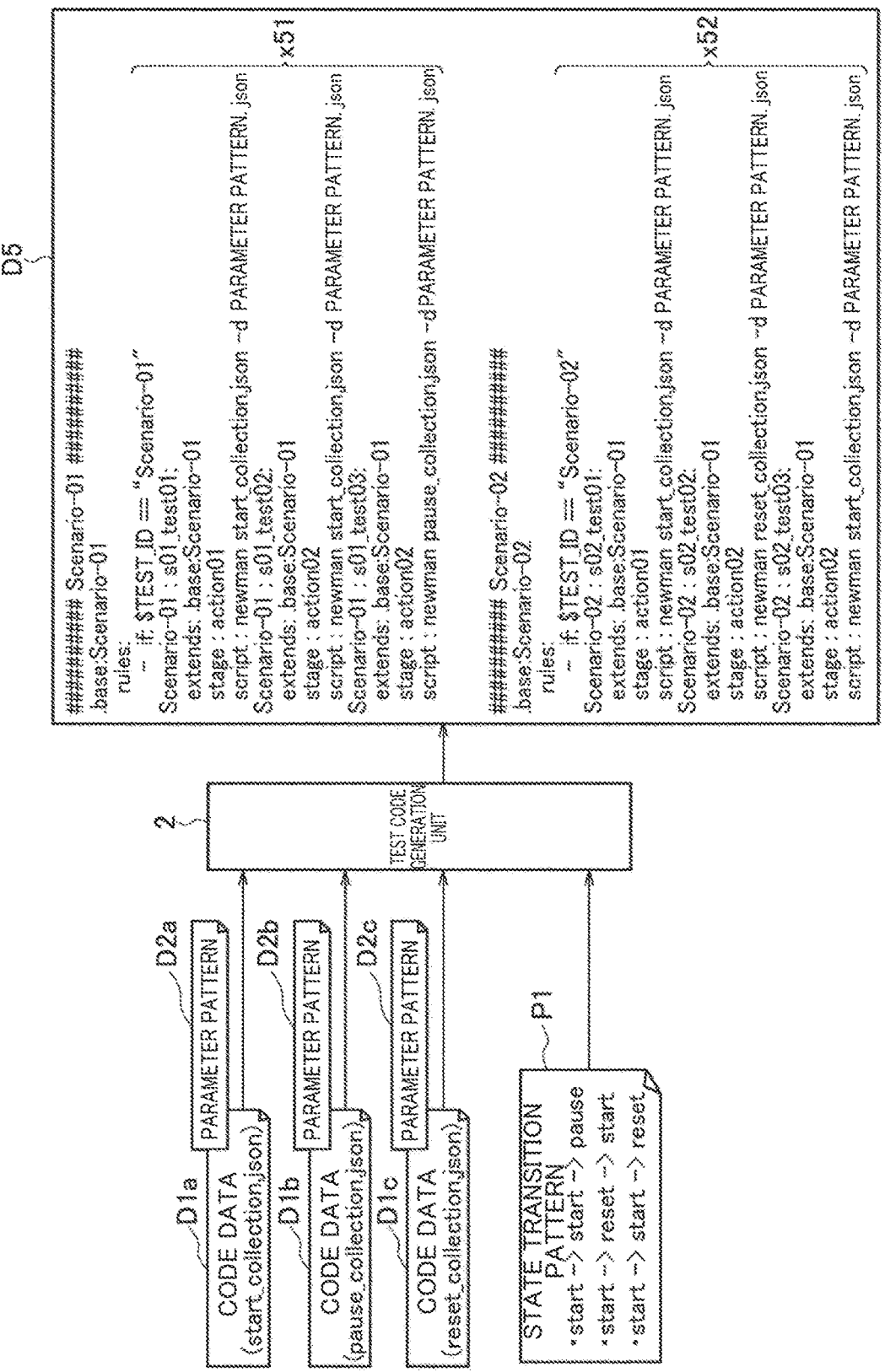
FIG. 20 is an explanatory diagram illustrating an example of a test code generated by the test code generation unit.

As illustrated in FIG. 20, the combination part 22 of the test code generation unit 2 combines a state transition pattern P1 generated by the N-switch coverage, and action code data D1a, D1b, and D1c and the parameter patterns D2a, D2b, and D2c respectively output from the action generation units 1a, 1b, and 1c, to generate a test code of the API adapter.

The test code is generated as a "yalm" file for "Gitlab continuous integration (CI)." "Newman" can be employed as the test code execution command.

As a result, a test code D5 illustrated in FIG. 20 is generated. A symbol x51 shown in the test code D5 indicates a state transition pattern of state transition patterns "start," "start," and "pause." Moreover, a symbol x52 indicates a state transition pattern of state transition patterns "start," "reset," and "start." As illustrated in FIG. 1, the test code D5 includes a plurality of test code groups D5a, D5b, D5c, . . . .

The test code output part 23 outputs the test code generated by the combination part 22 to an external device installed in a post-stage.

[Operation of Present Embodiment]

The operation of the test code generation device 100 according to the present embodiment will be described below with reference to a flowchart illustrated in FIG. 21.

Figure 21:
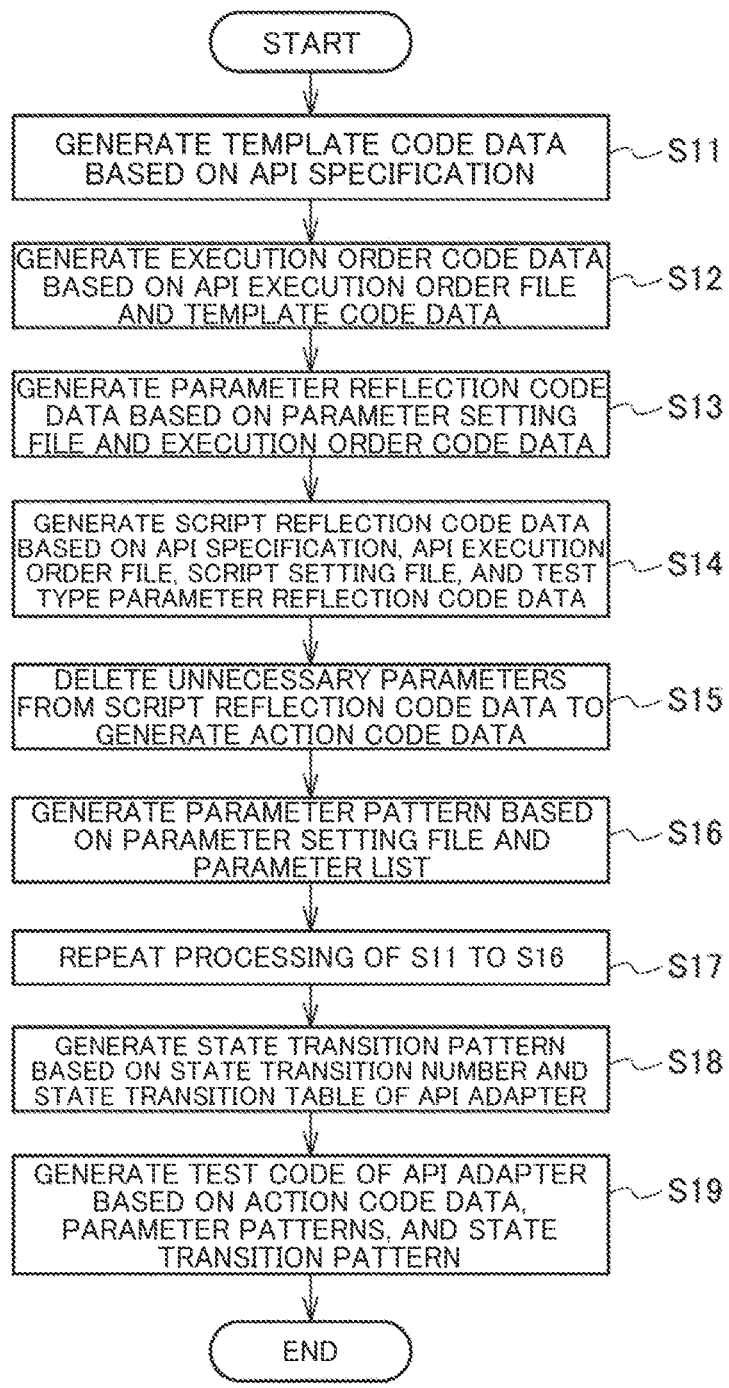
FIG. 21 is a flowchart illustrating a processing procedure by the test code generation device according to the present embodiment.

First, in step S11 illustrated in FIG. 21, the template code generation part 11 generates the template code data d11 serving as a template of a test code on the basis of the API specification d1.

In step S12, the API extraction part 12 generates the execution order code data d12 which is data of a test code reflecting the execution order on the basis of the API execution order file d2 and the template code data d11.

In step S13, the parameter correspondence setting part 13 generates the parameter reflection code data d13 which is data of a test code reflecting parameter correspondence on the basis of the parameter setting file d3 and the execution order code data d12.

In step S14, the script setting part 14 generates the script reflection code data d14 which is data of a test code reflecting a result checking script on the basis of the API specification d1, the API execution order file d2, the script setting file d4, the test type d5, and the parameter reflection code data d13.

In step S15, the unnecessary parameter deletion part 15 deletes unnecessary parameters from the script reflection code data d14 to generate the action code data D1.

In step S16, the parameter pattern generation part 16 generates the parameter pattern D2 on the basis of the parameter setting file d3 and the parameter list d6.

Thereafter, in step S17, the processing of steps S11 to S16 is repeatedly executed for each of the action generation units 1a, 1b, and 1c. As a result, the action code data D1a, D1b, and D1c and the parameter patterns D2a, D2b, and D2c are generated.

In step S18, the transition pattern generation part 21 generates the state transition pattern on the basis of the state transition number D3 and the state transition table D4 of the API adapter.

In step S19, the combination part 22 generates the test code D5 of the API adapter on the basis of the action code data D1a, D1b, and D1c, the parameter patterns D2a, D2b, and D2c, and the state transition pattern. Thus, the test code D5 of the API adapter can be automatically generated.

[Effects of Present Embodiment]

In this way, the test code generation device 100 according to the present embodiment includes the action generation unit 1 that acquires API-related data and generates action code data D1 corresponding to an action of a state transition pattern of an API adapter, and the test code generation unit 2 that generates a test code of the API adapter on the basis of the action code data D1 generated by the action generation unit 1 and the state transition pattern of the API adapter.

Therefore, it is possible to automatically generate a test code of the API adapter in consideration of the transition state.

Further, since the action generation unit 1 includes the template code generation part 11, the API extraction part 12, the parameter correspondence setting part 13, the script setting part 14, and the unnecessary parameter deletion part 15, it is possible to generate an appropriate test code corresponding to at least one of pieces of API-related data, that is, an API specification d1, an API execution order file d2, a parameter setting file d3, a script setting file d4, a test type d5, and a parameter list d6.

Further, the transition pattern generation part 21 generates a state transition pattern on the basis of a state transition number D3 and a state transition table D4. Moreover, the combination part 22 generates a test code on the basis of the state transition pattern, and action code data D1a, D1b, and D1c and parameter patterns D2a, D2b, and D2c generated by action generation units 1a, 1b, and 1c. Therefore, it is possible to generate an appropriate test code corresponding to each action of "start," "pause," and "reset."

Figure 22:
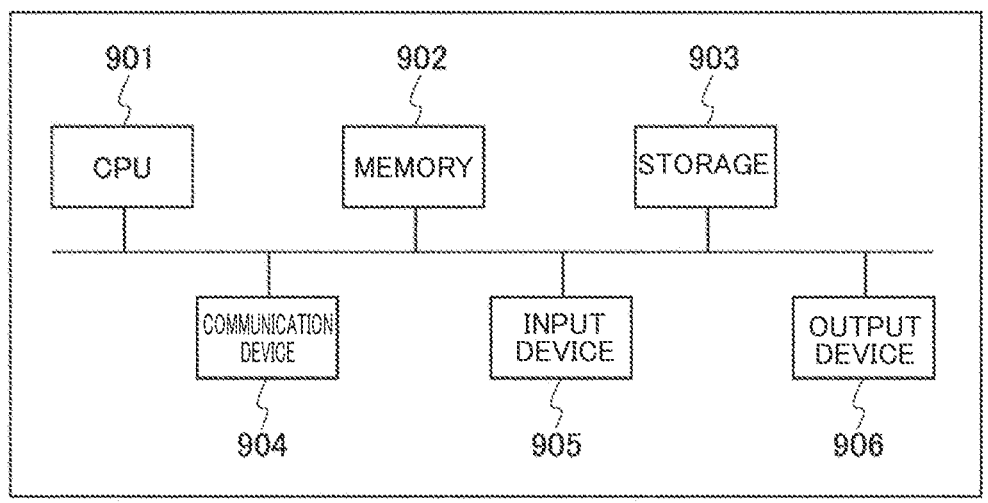
FIG. 22 is a block diagram illustrating a hardware configuration.

For the test code generation device 100 of the present embodiment described above, a general-purpose computer system including, for example, a central processing unit (CPU, a processor) 901, a memory 902, a storage 903 (a hard disk drive (HDD) or a solid state drive (SSD)), and a communication device 904, an input device 905, and an output device 906, as illustrated in FIG. 22, can be used. The memory 902 and the storage 903 are storage devices. In this computer system, each function of the test code generation device 100 is realized by the CPU 901 executing a predetermined program loaded on the memory 902.

The test code generation device 100 may be mounted in one computer or may be mounted in a plurality of computers. Further, the test code generation device 100 may be a virtual machine mounted in a computer.

A program for the test code generation device 100 can be stored in a computer-readable recording medium such as an HDD, an SSD, a Universal Serial Bus (USB) memory, a compact disc (CD), or a digital versatile disc (DVD), or can be distributed through a network.

The present invention is not limited to the above embodiment, and numerous modifications are available within the scope and gist of the invention.

REFERENCE SIGNS LIST 1 (1a, 1b, 1c) Action generation unit
2 Test code generation unit
3 Input data
11 Template code generation part
12 API extraction part
13 Parameter correspondence setting part
14 Script setting part
15 Unnecessary parameter deletion part
16 Parameter pattern generation part
21 Transition pattern generation part
22 Combination part
23 Test code output part
100 Test code generation device
161 PICT program
162 PICT output
163 Conversion program
d1 API specification
d2 API execution order file
d3 Parameter setting file
d4 Script setting file
d5 Test type
d6 Parameter list
d11 template code data
d12 Execution order code data
d13 Parameter reflection code data
d14 Script reflection code data
D1 (D1a, D1b, D1c) Action code data
D2 (D2a, D2a, D2c) Parameter pattern
D3 State transition number
D4 State transition table
D5 Test code

The invention claimed is:

1. A test code generation device comprising:
a memory storing instructions; and
one or more processors configured to execute the instructions to perform operations comprising:
acquiring application program interface (API)-related data and generating action code data corresponding to an action of a state transition pattern of an API adapter, wherein: the API-related data includes at least one of an API specification, an API execution order file, a parameter setting file, a script setting file, a test type, or a parameter list,
generating template code data serving as a template of a test code based on the API specification,
generating execution order code data reflecting an execution order using the API execution order file and the template code data,
generating parameter reflection code data reflecting parameter correspondence using the parameter setting file and the execution order code data,
generating script reflection code data reflecting a script using the script setting file and the parameter reflection code data,
deleting one or more parameters from the script reflection code data to generate the action code data,
generating a parameter pattern using the parameter setting file and the parameter list, and
generating a machine executable instantiation of test code of the API adapter based on the action code data, the parameter pattern, and the state transition pattern of the API adapter.

2. The test code generation device according to claim 1, wherein the state transition pattern includes a plurality of actions, and the action code data is generated for each action.

3. The test code generation device according to claim 1, wherein generating a machine executable instantiation includes:
generating the state transition pattern of the API adapter based on a state transition table and a state transition number of the API adapter, and
combining the state transition pattern and the action code data generated by the action generation unit to generate the test code of the API adapter.

4. The test code generation device according to claim 1, wherein the action of the state transition pattern includes:
at least one of a start indicator, a pause indicator, or a reset indicator.

5. A test code generation method comprising:
acquiring application program interface (API)-related data and generating action code data corresponding to an action of a state transition pattern of an API adapter, wherein: the API-related data includes at least one of an API specification, an API execution order file, a parameter setting file, a script setting file, a test type, or a parameter list;
generating template code data serving as a template of a test code based on the API specification;
generating execution order code data reflecting an execution order using the API execution order file and the template code data;
generating parameter reflection code data reflecting parameter correspondence using the parameter setting file and the execution order code data;
generating script reflection code data reflecting a script using the script setting file and the parameter reflection code data;
deleting one or more parameters from the script reflection code data to generate the action code data;
generating a parameter pattern using the parameter setting file and the parameter list; and
generating a machine executable instantiation of test code of the API adapter based on the action code data and the state transition pattern of the API adapter.

6. A non-transitory recording medium storing a test code generation program, wherein execution of the test code generation program causes a computer to perform operations comprising:
acquiring application program interface (API)-related data and generating action code data corresponding to an action of a state transition pattern of an API adapter, wherein: the API-related data includes at least one of an API specification, an API execution order file, a parameter setting file, a script setting file, a test type, or a parameter list;

generating template code data serving as a template of a test code based on the API specification;

generating execution order code data reflecting an execution order using the API execution order file and the template code data;

generating parameter reflection code data reflecting parameter correspondence using the parameter setting file and the execution order code data;

generating script reflection code data reflecting a script using the script setting file and the parameter reflection code data;

deleting one or more parameters from the script reflection code data to generate the action code data;

generating a parameter pattern using the parameter setting file and the parameter list; and generating a machine executable instantiation of test code of the API adapter based on the action code data, the parameter pattern, and the state transition pattern of the API adapter.

* * * * *